(12) United States Patent
Misumi et al.

(10) Patent No.: US 9,500,243 B2
(45) Date of Patent: Nov. 22, 2016

(54) BRAKE DEVICE

(71) Applicants: Ryutaro Misumi, Susono (JP); Youji Naito, Susono (JP)

(72) Inventors: Ryutaro Misumi, Susono (JP); Youji Naito, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 14/411,674

(22) PCT Filed: Jul. 30, 2013

(86) PCT No.: PCT/IB2013/001648
§ 371 (c)(1),
(2) Date: Dec. 29, 2014

(87) PCT Pub. No.: WO2014/033514
PCT Pub. Date: Mar. 6, 2014

(65) Prior Publication Data
US 2015/0176667 A1    Jun. 25, 2015

(30) Foreign Application Priority Data
Aug. 31, 2012  (JP) .................................. 2012-192473

(51) Int. Cl.
| | |
|---|---|
| *F16D 65/12* | (2006.01) |
| *F16D 65/00* | (2006.01) |
| *F16D 65/02* | (2006.01) |

(52) U.S. Cl.
CPC ......... *F16D 65/123* (2013.01); *F16D 65/0006* (2013.01); *F16D 2065/1384* (2013.01)

(58) Field of Classification Search
CPC .. F16D 65/0006; F16D 65/123; F16D 65/13; F16D 65/134; F16D 65/138; F16D 65/1384; F16D 65/1392
See application file for complete search history.

(56) References Cited

U.S. PATENT DOCUMENTS

| | | | | |
|---|---|---|---|---|
| 5,884,980 | A | * | 3/1999 | Visser ....................... B60B 3/16 188/218 XL |
| 6,145,632 | A | * | 11/2000 | Rutter ..................... B60B 3/008 188/17 |
| 2002/0003071 | A1 | * | 1/2002 | Torii ....................... B60B 27/00 188/218 XL |
| 2005/0045433 | A1 | * | 3/2005 | Sakamoto ............... B60B 27/00 188/18 A |
| 2005/0232526 | A1 | * | 10/2005 | Sakamoto ............... B60B 27/00 384/544 |
| 2006/0201760 | A1 | * | 9/2006 | Brunetti ................ F16D 65/123 188/218 XL |

FOREIGN PATENT DOCUMENTS

| | | |
|---|---|---|
| JP | 2003-148527 A | 5/2003 |
| JP | 2004-019715 A | 1/2004 |

* cited by examiner

*Primary Examiner* — Vishal Sahni
(74) *Attorney, Agent, or Firm* — Sughrue Mion, PLLC

(57) ABSTRACT

A brake device includes a hub (2); a wheel (4); a disc rotor (3) arranged between the hub (2) and the wheel (4); a fixing portion (5) that fixes the hub (2), the disc rotor (3), and the wheel (4) together by being inserted into a hub through-hole (23), a rotor through-hole (34), and a wheel through-hole (42); a hub-side connecting portion (25; 8) that connects the hub (2) and the disc rotor (3) together with the hub (2) separated from the disc rotor (3), by abutting against a hub-side end portion (34*a*) of the disc rotor (3), which defines the rotor through-hole (34); and a wheel-side connecting portion (45; 9) that connects the disc rotor (3) and the wheel (4) together with the disc rotor (3) separated from the wheel (4), by abutting against a wheel-side end portion (34*b*) of the disc rotor (3), which defines the rotor through-hole (34).

8 Claims, 6 Drawing Sheets

BRAKE DEVICE

BACKGROUND OF THE INVENTION

1. Field of the Invention

The invention relates to a brake device in which a disc rotor is arranged between a hub and a wheel.

2. Description of Related Art

A brake device generates braking torque by forcing a pad into contact with a rotating disc rotor by hydraulic pressure from a hydraulic cylinder, for example. In this brake device, when the pad contacts the rotating disc rotor, vibration occurs, and so-called brake noise is produced by the rotating disc rotor and the pad resonating. Here, brake noise includes both out-of-plane noise and in-plane noise. Out-of-plane noise is caused by out-of-plane vibration (i.e., vibration in the out-of-plane direction) in which a friction surface of the disc rotor that the pad contacts vibrates in the same direction as a rotation axis. In-plane noise is caused by in-plane vibration (i.e., vibration in the in-plane direction) in which the friction surface of the disc rotor vibrates in the circumferential direction of the disc rotor.

For in-plane vibration, Japanese Patent Application Publication No. 2004-019715 (JP 2004-019715 A) proposes a method that involves estimating an eigenvalue of in-plane vibration of the disc rotor (hereinafter, this value will simply be referred to as an "in-plane eigenvalue"). Using estimating technology such as that described in JP 2004-019715 A, it is possible to set the in-plane eigenvalue of the disc rotor to a desired value.

The disc rotor is assembled between a hub and a wheel, and is connected to the hub and the wheel. Therefore, the in-plane eigenvalue of the disc rotor when the disc rotor is fastened to the hub and the wheel may change, depending on the method by which the disc rotor is fastened to the hub and the wheel. If the in-plane eigenvalue of the disc rotor when the disc rotor is fastened changes, in-plane noise may not be able to be effectively suppressed by assembling the disc rotor to the hub and the wheel, even if the disc rotor is designed to suppress in-plane noise.

SUMMARY OF THE INVENTION

The invention thus provides a brake device capable of inhibiting a change in an in-plane eigenvalue of a disc rotor when the disc rotor is fastened.

A first aspect of the invention relates to a brake device that includes a hub in which a hub through-hole is formed; a wheel in which a wheel through-hole is formed; a disc rotor in which a rotor through-hole is formed, and that is arranged between the hub and the wheel; a fixing portion that fixes the hub, the disc rotor, and the wheel together by being inserted into the hub through-hole, the rotor through-hole, and the wheel through-hole; a hub-side connecting portion that is positioned between the hub and the disc rotor, and connects the hub and the disc rotor together with the hub separated from the disc rotor, by abutting against a hub-side end portion of the rotor through-hole; and a wheel-side connecting portion that is positioned between the disc rotor and the wheel, and connects the disc rotor and the wheel together with the disc rotor separated from the wheel, by abutting against a wheel-side end portion of the rotor through-hole.

In the brake device described above, the hub-side connecting portion and the wheel-side connecting portion may each be formed in an annular shape, and the fixing portion may be inserted into the hub-side connecting portion and the wheel-side connecting portion.

In the brake device described above, the hub-side connecting portion may protrude from a surface of the hub that faces the disc rotor, and be formed in a tapered shape so as to become smaller in diameter farther toward a tip end portion, and the wheel-side connecting portion may protrude from a surface of the wheel that faces the disc rotor, and be formed in a tapered shape so as to become smaller in diameter farther toward a tip end portion. In this case, a diameter of the tip end portion of each of the hub-side connecting portion and the wheel-side connecting portion may be smaller than a diameter of the rotor through-hole, and a portion of the hub-side connecting portion and a portion of the wheel-side connecting portion may be inserted into the rotor through-hole.

In the brake device described above, the hub-side connecting portion may be a hub-side collar that abuts, at a hub-side end portion of the hub-side collar, against a surface of the hub that faces the disc rotor, and be formed in a tapered shape so as to become smaller in diameter from the hub-side end portion toward a tip end portion, and the wheel-side connecting portion may be a wheel-side collar that abuts, at a wheel-side end portion of the wheel-side collar, against a surface of the wheel that faces the disc rotor, and be formed in a tapered shape so as to become smaller in diameter from the wheel-side end portion toward a tip end portion. In this case, a diameter of the tip end portion of each of the hub-side connecting portion and the wheel-side connecting portion may be smaller than a diameter of the rotor through-hole, and a portion of the hub-side connecting portion and a portion of the wheel-side connecting portion may be inserted into the rotor through-hole.

In the brake device described above, a tip end portion of one of the hub-side connecting portion and the wheel-side connecting portion may be press-fit into the other of the hub-side connecting portion and the wheel-side connecting portion.

The brake device described above may also include a retaining portion that is a retaining portion that is provided at at least one of a position between the hub and the disc rotor and on an outer peripheral side of the hub-side connecting portion, and a position between the disc rotor and the wheel and on an outer peripheral side of the wheel-side connecting portion, and there may be a predetermined clearance between the retaining portion and at least one of the hub, the disc rotor, and the wheel that faces the retaining portion.

In the brake device described above, the retaining portion may include a first retaining portion provided between the hub and the disc rotor, and a second retaining portion provided between the disc rotor and the wheel. Also, the first retaining portion and the second retaining portion may face each other in an axial direction of the disc rotor.

In the brake device described above, the hub through-hole may be formed through an inside of the hub-side connecting portion and the wheel through-hole may be formed through an inside of the hub-side connecting portion. Also, the fixing portion may be inserted into the hub-side connecting portion and the hub-side connecting portion, by being inserted into the hub through-hole and the wheel through-hole.

With the brake device described above, it is possible to inhibit a change in an in-plane eigenvalue of a disc rotor when the disc rotor is fastened.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Modes for carrying out the invention (i.e., example embodiments) will now be described in detail with reference to the accompanying drawings. The invention is not limited by the content described in the example embodiment below. Also, the constituent elements described below are intended to include elements that are substantially the same, as well as elements that are easily envisioned by one skilled in the art. Furthermore, structures described below may be combined as appropriate. Also, various omissions, substitutions, or modifications of the structure without departing from the scope of the invention are also possible.

First Example Embodiment

Figure 1:
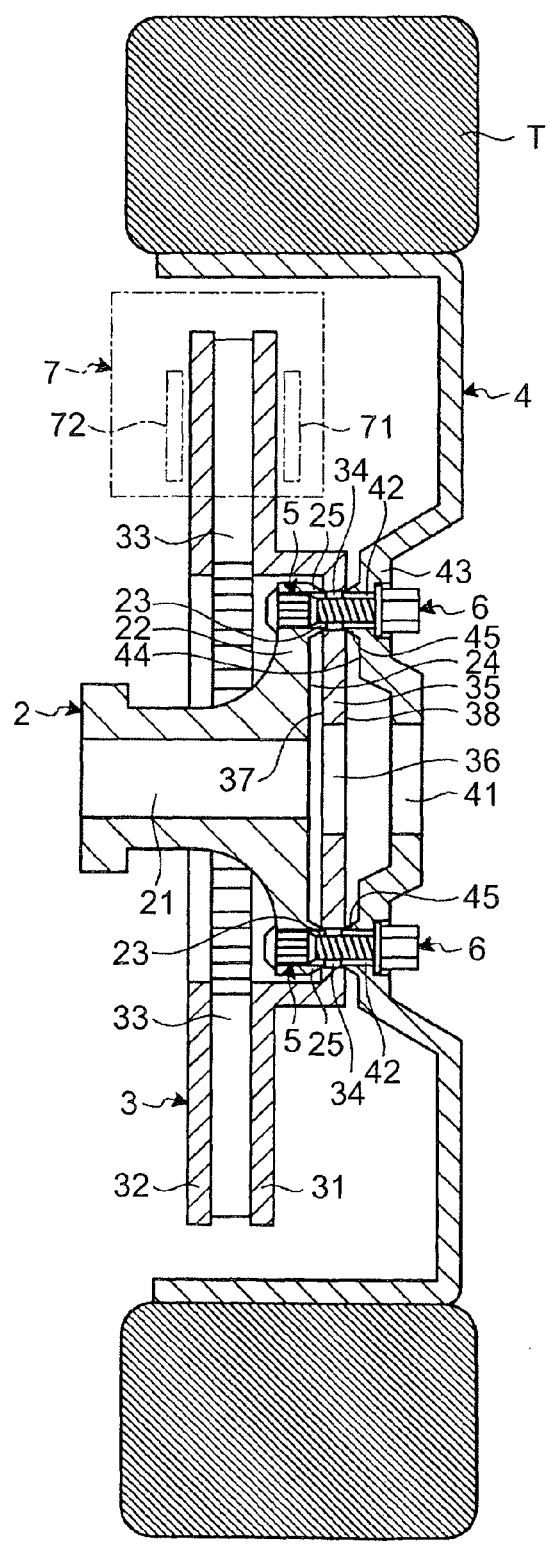
FIG. 1 is a view of an example structure of a brake device according to a first example embodiment of the invention.
Figure 2:
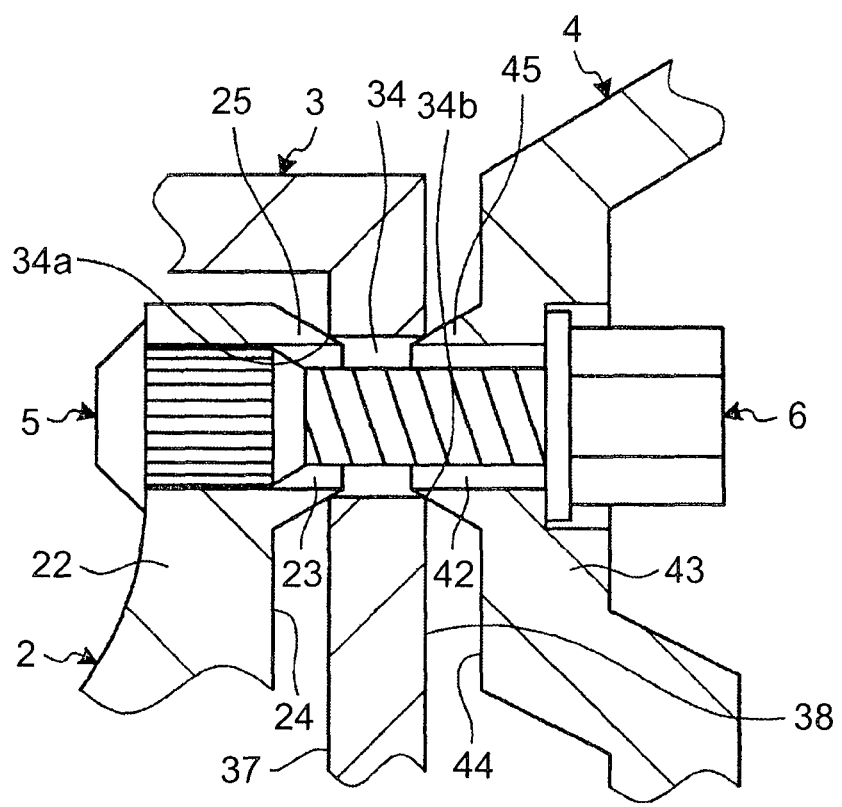
FIG. 2 is a view of a hub, a disc rotor, and a wheel of the brake device according to the first example embodiment.
Figure 3:
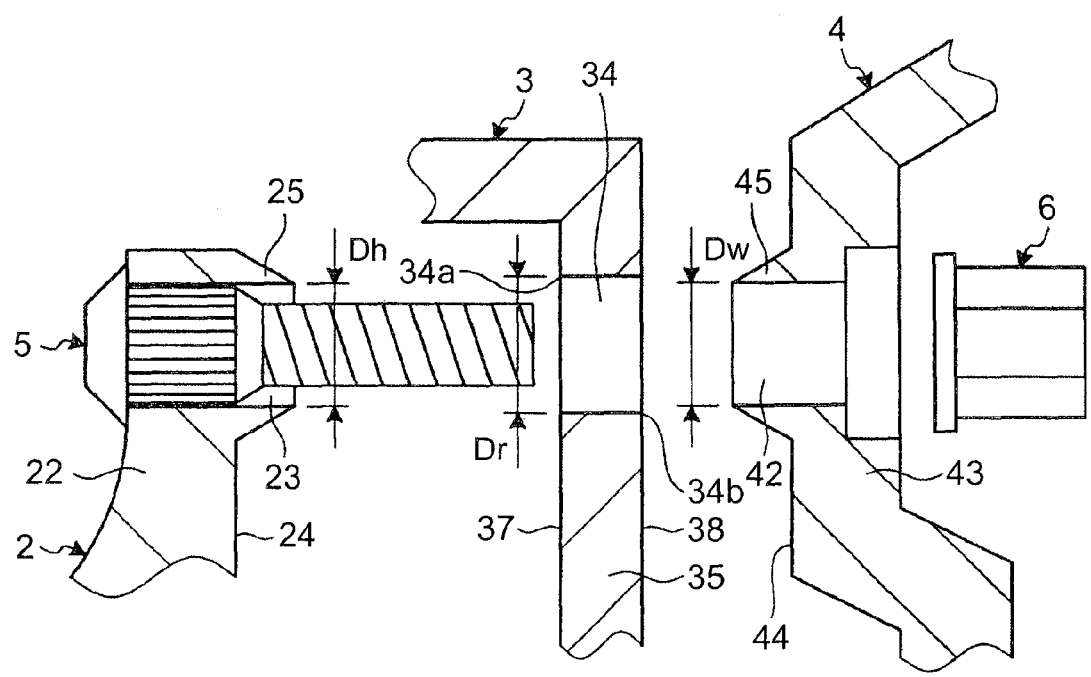
FIG. 3 is a view of the hub, the disc rotor, and the wheel of the brake device according to the first example embodiment.

A disc rotor according to a first example embodiment of the invention will now be described. FIG. 1 is a view of an example structure of a brake device according to the first example embodiment. FIGS. 2 and 3 are views of a hub, a disc rotor, and a wheel of the brake device according to the first example embodiment. FIG. 1 is a sectional view of a plane that includes a shaft of the disc rotor, FIG. 2 is an enlarged view of the main portions shown in FIG. 1, and FIG. 3 is a partial expanded view of the constituent elements shown in FIG. 2.

As shown in FIG. 1, a brake device 1-1 according to the first example embodiment includes a hub 2, a disc rotor 3, a wheel 4, a plurality of hub bolts 5 that serve as fixing portions, hub nuts 6 (hereinafter, these will be described in the singular when possible to facilitate understanding), a hub-side protruding portion 25 that serves as a hub-side connecting portion, a wheel-side protruding portion 45 that serves as a wheel-side connecting portion, and a caliper 7. In the brake device 1-1, pads 71 and 72 provided on the caliper 7 are arranged facing the disc rotor 3 in the axial direction of the disc rotor 3. A hydraulic cylinder, not shown, is provided in the caliper 7. Pressure generated by the hydraulic cylinder brings the pads 71 and 72 closer together, such that they (i.e., the pads 71 and 72) contact the disc rotor 3 that rotates together with a drive shaft, not shown, via the hub 2. As a result, frictional force is generated. The generated frictional force is applied to the caliper 7 in a direction opposite the direction of rotation of the disc rotor 3, and thus becomes braking force that decelerates a vehicle provided with the brake device 1-1, not shown. That is, the brake device 1-1 is a device that generates braking force.

The hub 2 faces the disc rotor 3 on a hub side, i.e., one side, of the disc rotor 3 (i.e., faces a hub-side surface of the disc rotor 3), and rotates together with the disc rotor 3. A shaft through-hole 21 into which the drive shaft, not shown, is inserted is formed at the center of rotation in the hub 2. Splines formed in the shaft through-hole 21 engage with splines formed on the drive shaft, such that the hub 2 rotates together with the drive shaft. A shaft nut, not shown, is screwed onto a tip end portion of the drive shaft after the drive shaft has been inserted into the shaft through-hole 21, such that the hub 2 is fixed to the drive shaft. Also, a flange portion 22 is farmed on the side of the hub 2 that faces the disc rotor 3 (i.e., on an end portion of the hub 2 that faces the disc rotor 3). Hub through-holes 23 are formed in a plurality of locations, e.g., four to six locations, at equal distances in the circumferential direction, in the flange portion 22. Also, hub-side protruding portions 25 are formed on a rotor-side fastening surface 24 of the hub 2, which is a surface of the hub 2 that faces the disc rotor 3. These hub-side protruding portions 25 correspond to the hub through-holes 23 and protrude toward the disc rotor 3, as shown in FIG. 2. Hereinafter, the hub through-holes 23 and the hub-side connecting portions 25 will both be described in the singular when possible to facilitate understanding. The hub-side protruding portion 25 is formed in an annular shape in a position between the hub 2 and the disc rotor 3, and is tapered so as to become smaller in diameter farther toward a tip end portion (i.e., the end portion on the disc rotor 3 side). Here, the hub through-hole 23 is formed through the inside of the hub-side protruding portion 25. A diameter Dh of the tip end portion of the hub-side protruding portion 25 is set smaller than a diameter Dr of a rotor through-hole 34 that will be described later, as shown in FIG. 3, and a portion of the hub-side protruding portion 25 is inserted into the rotor through-hole 34. Also, the amount that the hub-side protruding portion 25 protrudes from the rotor-side fastening surface 24 is set such that a gap is formed between the rotor-side fastening surface 24 and a hub-side fastening surface 37 when the disc rotor 3 and the wheel 4 are fastened to the hub 2, as shown in FIG. 2. The hub-side fastening surface 37 is a surface of the disc rotor 3 at a hat portion 35, which faces the hub 2.

The disc rotor 3 is a ventilated disc rotor that is molded out of molding metal material such as cast iron. In this example embodiment, the disc rotor 3 is such that an eigenvalue of in-plane vibration (hereinafter, simply referred to as "in-plane eigenvalue") is set to a desired value by any of a variety of methods, such as by measuring the in-plane eigenvalue through testing, or by analyzing a movement model and estimating the in-plane eigenvalue. The disc rotor 3 is formed by two sliding plates 31 and 32, a plurality of fins 33, and a plurality of rotor through-holes 34 (hereinafter, the fins 33 and the rotor through-hole 34 will both be described in the singular when possible to facilitate understanding), as shown in FIG. 1. The two sliding plates 31 and 32 oppose each other in the axial direction, and the plurality of fins 33 are formed between these sliding plates 31 and 32. The plurality of fins 33 are formed continuous in the circumferential direction, and both end portions in the axial direction are connected to the sliding plates 31 and 32. The rotor through-holes 34 correspond to the hub through-holes 23, and are formed in the hat portion 35 of the sliding plate 31, that is formed protruding toward the wheel 4. A nut insertion hole 36 into which a shaft nut is inserted is formed at the center of rotation in the hat portion 35.

The wheel 4 has a tire T mounted thereto, faces the disc rotor 3 on a wheel side, i.e., the other side, of the disc rotor 3 (i.e., faces a wheel-side surface of the disc rotor 3), and rotates together with the disc rotor 3. That is, the disc rotor 3 is arranged between the hub 2 and the wheel 4. A shaft insertion hole 41 into which the drive shaft, not shown, is inserted formed at the center of rotation in the wheel 4. A wheel fixing portion 43 is formed protruding in the axial direction (i.e., toward the disc rotor 3) on the wheel 4, and a plurality of wheel through-holes 42 formed corresponding to the rotor through-holes 34 are formed in this wheel fixing portion 43. Also, on the wheel 4, as shown in FIG. 2, wheel-side protruding portions 45 are formed protruding toward the disc rotor 3, corresponding to the wheel through-holes 42, in a rotor-side fastening surface 44 that is a surface of the wheel 4 that faces the disc rotor 3. Hereinafter, the wheel through-holes 42 and the wheel-side protruding portions 45 will both be described in the singular when possible to facilitate understanding. The wheel-side protruding portion 45 is positioned between the disc rotor 3 and the wheel 4, and is formed in an annular shape, and is tapered so as to become smaller in diameter farther toward a tip end portion (i.e., the end portion on the disc rotor 3 side). Here, the wheel through-hole 42 is formed through the inside of the wheel-side protruding portion 45. A diameter Dw of the tip end portion of the wheel-side protruding portion 45 is set smaller than a diameter Dr of the rotor through-hole 34, as shown in FIG. 3, and a portion of the wheel-side protruding portion 45 is inserted into the rotor through-hole 34. Also, the amount that the wheel-side protruding portion 45 protrudes from the rotor-side fastening surface 44 is set such that a gap is formed between the rotor-side fastening surface 44 and a wheel-side fastening surface 38 when the disc rotor 3 and the wheel 4 are fastened to the hub 2, as shown in FIG. 2. The wheel-side fastening surface 38 is a surface of the disc rotor 3 at the hat portion 35, which faces the wheel 4.

The hub bolt 5 and the hub nut 6 fasten the disc rotor 3 and the wheel 4 to the hub 2 by being screwed together while sandwiching the hub 2, the disc rotor 3, and the wheel 4, as shown in FIG. 1. The hub bolt 5 fixes the hub 2, the disc rotor 3, and the wheel 4 together by being inserted through the hub through-hole 23, the rotor through-hole 34, and the wheel through-hole 42 in order, and then having the hub nut 6 screwed onto a tip end portion that is exposed from the wheel through-hole 42. That is, the hub bolt 5 is inserted into the hub-side protruding portion 25 and the wheel-side protruding portion 45, by being inserted into the hub through-hole 23 and the wheel through-hole 42. Here, splines are formed on the hub bolt 5 in a position facing the hub through-hole 23, when the hub bolt 5 is inserted into the hub through-hole 23. Relative rotation between the hub bolt 5 and the hub 2 is restricted by the splines of the hub bolt 5 engaging with the splines formed in the hub through-hole 23. Therefore, the hub bolt 5 and the hub nut 6 are able to be screwed together by turning the hub nut 6 with respect to the hub bolt 5.

Next, the fastening state of the disc rotor 3 of the brake device 1-1 according to this example embodiment will be described. When the disc rotor 3 and the wheel 4 are fastened to the hub 2 by the hub bolt 5 and the hub nut 6 as described above, a tip end portion of the hub-side protruding portion 25 enters the rotor through-hole 34 from a hub-side end portion 34a of the disc rotor 3, which defines the rotor through-hole 34, and a tip end portion of the wheel-side protruding portion 45 enters the rotor through-hole 34 from a wheel-side end portion 34b of the disc rotor 3, which defines the rotor through-hole 34. As a result, when fastening the disc rotor 3 and the wheel 4 to the hub 2, the disc rotor 3 and the wheel 4 are able to be positioned with respect to the hub 2 (i.e., the axis of the disc rotor 3 and the axis of the wheel 4 are able to be aligned with the axis of the hub 2). When the disc rotor 3 and the wheel 4 are fastened to the hub 2, an outer peripheral surface of the hub-side protruding portion 25 abuts against the hub-side end portion 34a of the disc rotor 3, and an outer peripheral surface of the wheel-side protruding portion 45 abuts against the wheel-side end portion 34b of the disc rotor 3. When the hub-side protruding portion 25 abuts against a boundary between the hub-side fastening surface 37 and the rotor through-hole 34 of the disc rotor 3, the distance between the hub 2 and the disc rotor 3 cannot be reduced any more. Similarly, when the wheel-side protruding portion 45 abuts against a boundary between the rotor through-hole 34 and the wheel-side fastening surface 38, the distance between the disc rotor 3 and the wheel 4 cannot be reduced any more. At this time, the rotor-side fastening surface 24 is separated from the hub-side fastening surface 37 (i.e., a portion excluding the portion with the rotor through-hole 34), and the rotor-side fastening surface 44 is separated from the wheel-side fastening surface 38 (i.e., a portion excluding the portion with the rotor through-hole 34). That is, when the disc rotor 3 and the wheel 4 are fastened to the hub 2, the disc rotor 3 and the hub 2 except for the hub-side protruding portion 25 are connected in a separated state, and the wheel 4 and the disc rotor 3 except for the wheel-side protruding portion 45 are connected in a separated state. Therefore, the contact portion between the hub 2 and the disc rotor 3 is only the portion where the hub-side protruding portion 25 abuts against the disc rotor 3, and the contact portion between the disc rotor 3 and the wheel 4 is only the portion where the wheel-side protruding portion 45 abuts against the disc rotor 3 (line contact or point contact in this example embodiment), so the hub 2, the disc rotor 3, and the wheel 4 are fixed only at portion with the rotor through-hole 34.

Above, with the brake device 1-1 according to this example embodiment, when the disc rotor 3 and the wheel 4 are fastened to the hub 2, the disc rotor 3 is able to be connected to the hub 2 and the wheel 4 in a state separated from the hub 2 and the wheel 4, except for the contact portion where the hub-side protruding portion 25 and the wheel-side protruding portion 45 contact the rotor through-hole 34. Accordingly, the rotor-side fastening surface 24 is made to abut against (is in surface contact with) the hub-side fastening surface 37, and the rotor-side fastening surface 44 is made to abut against (is in surface contact with) the wheel-side fastening surface 38, which enables the contact portion to be reduced compared with when these are connected together. As a result, the effect of the hub 2 and the wheel 4 on the disc rotor 3 is able to be suppressed. Therefore, even if a disc rotor 3 of which the in-plane eigenvalue has been set to a desired value is assembled to the hub 2 and the wheel 4, the effect of the hub 2 and the wheel 4 on the in-plane eigenvalue of the disc rotor 3 is able to be suppressed. Therefore, the in-plane eigenvalue of the disc rotor 3 when the disc rotor 3 and the wheel 4 are fastened to the hub 2 is able to be inhibited from changing from the desired value, so in-plane noise in the brake device 1-1 is able to be inhibited. That is, even if the material or type of the hub 2 and the wheel 4 to which the disc rotor 3 is assembled differs, the in-plane eigenvalue of the disc rotor 3 when the disc rotor 3 and the wheel 4 are fastened to the hub 2 is able to be inhibited from changing from the desired value, so in-plane noise in the brake device 1-1 is able to be inhibited, regardless of the material or type of wheel 4 and hub 2 to which the disc rotor 3 is assembled.

First Modified Example

Figure 4:
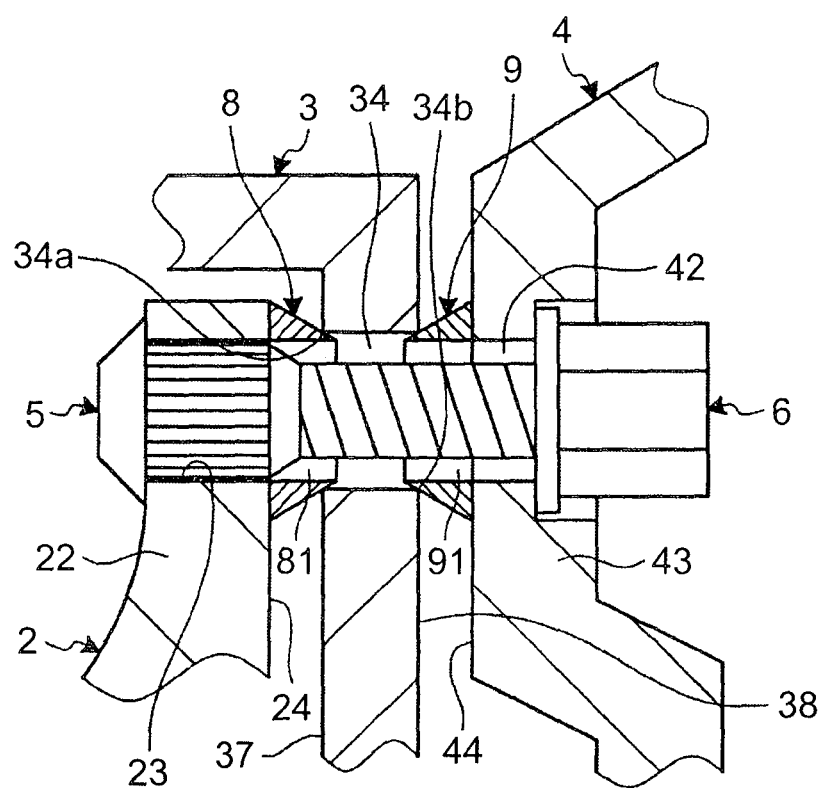
FIG. 4 is a view of a hub, a disc rotor, and a wheel of a brake device according to a first modified example of the first example embodiment.

In the first example embodiment described above, the hub-side protruding portion 25 and the wheel-side protruding portion 45 are integrally formed on the hub 2 and the wheel 4, respectively, but the invention is not limited to this. FIG. 4 is a view of a hub, a disc rotor, and a wheel of a brake device according to a first modified example of the first example embodiment of the invention. As shown in FIG. 4, a hub-side connecting portion and a wheel-side connecting portion are provided separately as a hub-side collar 8 and a wheel-side collar 9 on the hub 2 and the wheel 4.

The hub-side collar 8 is positioned between the hub 2 and the disc rotor 3, and includes a hub-side collar through-hole 81 into which the hub bolt 5 is inserted. The hub-side collar 8 is formed in an annular shape, and is tapered so as to become smaller in diameter farther toward a tip end portion (i.e., the end portion on the disc rotor 3 side). Here, the diameter of the tip end portion of the hub-side collar 8 is set smaller than the diameter Dr of the rotor through-hole 34, similar to the case with the hub-side protruding portion 25 in the first example embodiment, and a portion of the hub-side collar 8 is inserted into the rotor through-hole 34. Also, the height of the hub-side collar 8 in the axial direction is set such that a gap is formed between the rotor-side fastening surface 24 and a hub-side fastening surface 37 when the disc rotor 3 and the wheel 4 are fastened to the hub 2.

The wheel-side collar 9 is positioned between the disc rotor 3 and the wheel 4, and has a wheel-side collar through-hole 91 into which the hub bolt 5 is inserted. The wheel-side collar 9 is formed in an annular shape, and is tapered so as to become smaller in diameter farther toward a tip end portion (i.e., the end portion on the disc rotor 3 side). Here, the diameter of the tip end portion of the wheel-side collar 9 is set smaller than the diameter Dr of the rotor through-hole 34, similar to the case with the hub-side protruding portion 25 in the first example embodiment, and a portion of the wheel-side collar 9 is inserted into the rotor through-hole 34. Also, the height of the wheel-side collar 9 in the axial direction is set such that a gap is formed between the rotor-side fastening surface 44 and the wheel-side fastening surface 38 when the disc rotor 3 and the wheel 4 are fastened to the hub 2.

When fastening the disc rotor 3 and the wheel 4 to the hub 2, the hub bolt 5 is inserted through the hub through-hole 23, the hub-side collar through-hole 81, the rotor through-hole 34, the wheel-side collar through-hole 91, and the wheel through-hole 42 in order. As a result, when the disc rotor 3 and the wheel 4 are fastened to the hub 2, an outer peripheral surface of the hub-side collar 8 abuts against the hub-side end portion 34a of the disc rotor 3, and an outer peripheral surface of the wheel-side collar 9 abuts against the wheel-side end portion 34b of the disc rotor 3. Therefore, the same effects as in the first example embodiment described above are displayed. In addition, the same effects as in the first example embodiment are able to be displayed by using the hub-side collar 8 and the wheel-side collar 9, when assembling the disc rotor 3 of which the in-plane eigenvalue is set to a desired value, to an existing brake device, i.e., the hub 2 on which the hub-side protruding portion 25 is not formed and the wheel 4 on which the wheel-side protruding portion 45 is not formed.

Second Modified Example

Figure 5:
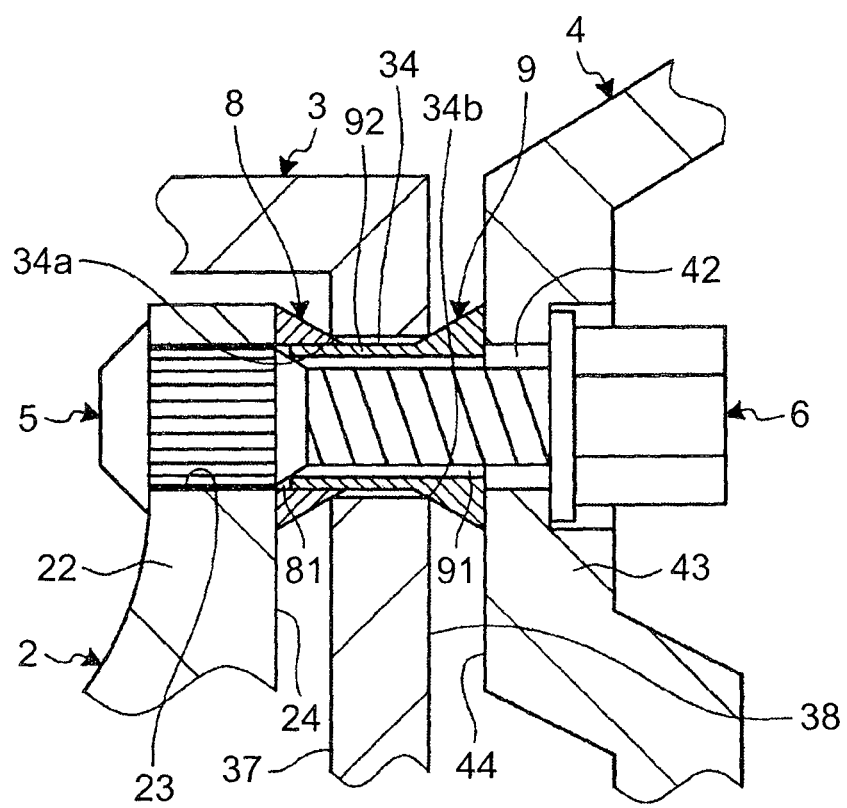
FIG. 5 is a view of a hub, a disc rotor, and a wheel of the brake device according to a second modified example of the first example embodiment.

In the first modified example, the hub-side collar 8, the wheel-side collar 9, and the wheel-side collar 9 are fit onto the hub bolt 5 separately, but the invention is not limited to this. FIG. 5 is a view of a hub, a disc rotor, and a wheel of a brake device according to a second modified example of the first example embodiment of the invention. As shown in FIG. 5, the hub-side collar 8 and the wheel-side collar 9 may be attached to the disc rotor 3 in advance by press-fitting a tip end portion of one of the hub-side collar 8 and the wheel-side collar 9 into the other of the hub-side collar 8 and the wheel-side collar 9.

The wheel-side collar 9 has a protruding portion 92 formed thereon that protrudes toward the disc rotor 3 from a tip end portion of the wheel-side collar 9 (i.e., the end portion on the disc rotor 3 side) according to the first modified example. The outer diameter of the protruding portion 92 is set such that the protruding portion 92 is able to be press-fit into the hub-side collar through-hole 81. That is, the tip end portion of the wheel-side collar 9 is formed as the protruding portion 92. In this case, before fastening with the hub bolt 5, the hub-side collar 8 is arranged facing the rotor through-hole 34 on the hub-side surface of the disc rotor 3, and the wheel-side collar 9 is arranged facing the rotor through-hole 34 on the wheel-side surface of the disc rotor 3 beforehand. Then the protruding portion 92 is inserted into the rotor through-hole 34, and the protruding portion 92 is press-fit into the hub-side collar through-hole 81, such that the hub-side collar 8 and the wheel-side collar 9 are attached to the disc rotor 3 beforehand. Here, the abutment of the outer peripheral surface of the hub-side collar 8 and the hub-side end portion 34a of the disc rotor 3, and the abutment of the outer peripheral surface of the wheel-side collar 9 and the wheel-side end portion 34b of the disc rotor 3 may be performed by attaching the hub-side collar 8 and the wheel-side collar 9 to the disc rotor 3 beforehand, or may be performed when screwing the hub bolt 5 and the hub nut 6 together when the disc rotor 3 and the wheel 4 are fastened to the hub 2. Therefore, in addition to displaying the same effects as in the first example embodiment described above, by attaching the hub-side collar 8 and the wheel-side collar 9 to the disc rotor 3 in advance, they can be handled as a single unit, so the work and the like of fitting the hub-side collar 8 and the wheel-side collar 9 separately onto the hub bolt 5 when replacing a disc rotor of an existing brake device with the disc rotor 3 of which the in-plane eigenvalue is set to a desired value can be reduced. Thus, an effect of being able to shorten the time that it takes to replace the disc rotor is also displayed. In the second modified example, the protruding portion 92 of the wheel-side collar 9 is press-fit into the hub-side collar 8, but the hub-side collar 8 and the wheel-side collar 9 may also be attached to the disc rotor 3 by forming a male thread groove in the protruding portion 92, and forming a female thread groove in the hub-side collar through-hole 81 and screwing the two together.

First Example Embodiment

Figure 6:
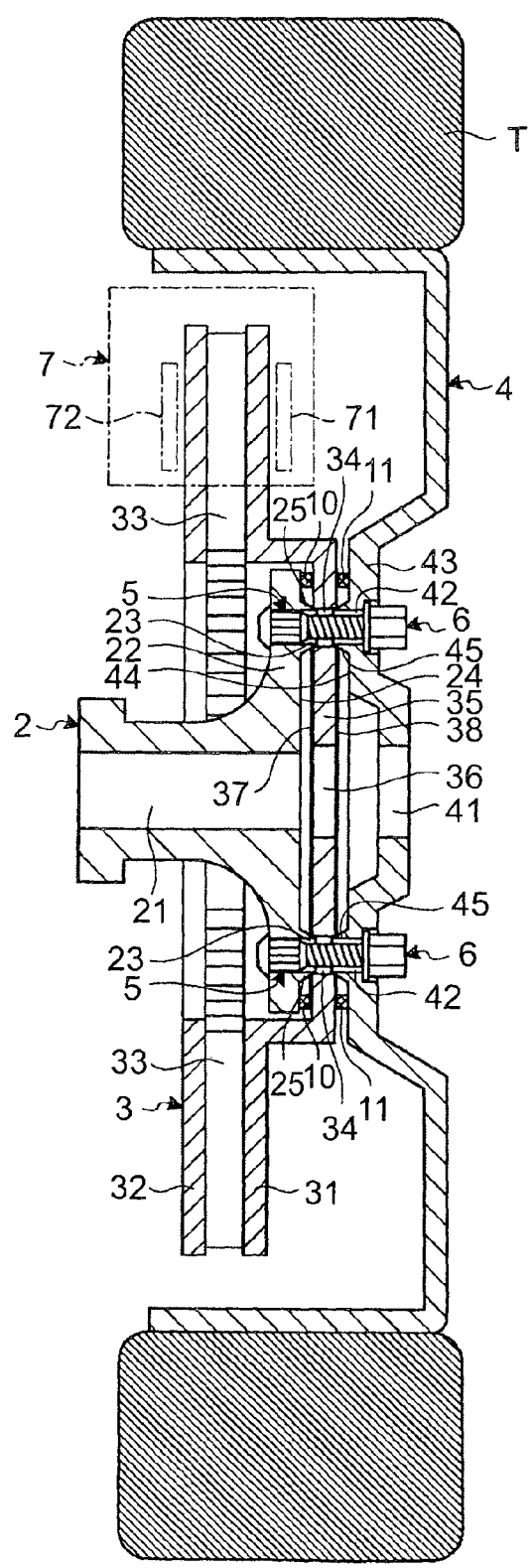
FIG. 6 is a view of an example structure of a brake device according to a second example embodiment of the invention.

Next, a brake device according to a second example embodiment of the invention will be described. FIG. 6 is a view of an example structure of a brake device according to a second example embodiment. A brake device 1-2 according to this second example embodiment in the drawing differs from the brake device 1-1 according to the first example embodiment (including the first and second modified examples thereof) in that a first retaining protruding portion 10 is provided between the hub 2 and the disc rotor 3, and a second retaining protruding portion 11 is provided between the disc rotor 3 and the wheel 4.

The first retaining protruding portion 10 serves as a retaining portion, and is provided between the hub 2 and the disc rotor 3. In this example embodiment, the first retaining protruding portion 10 is formed in an annular shape protruding toward the disc rotor 3, on the rotor-side fastening surface 24. That is, the first retaining protruding portion 10 is integrally formed with the hub 2. The first retaining protruding portion 10 is arranged on the outer peripheral side of the hub-side protruding portion 25, and is formed facing the hub-side fastening surface 37 of the hat portion 35 in the axial direction. Here, clearance between a tip end portion of the first retaining protruding portion 10 (i.e., the end portion on the disc rotor 3 side) and the hub-side fastening surface 37 of the disc rotor 3 is set to no more than 0.5 mm, in a state in which the disc rotor 3 and the wheel 4 are fastened to the hub 2 and no axial force, e.g., lateral force when the vehicle is turning or the like, acts on them. A state in which the clearance is no more than 9.5 mm may include a state in which the tip end portion of the first retaining protruding portion 10 abuts against the hub-side fastening surface 37 (in this case, a state in which one is not placing a load on the other in the axial direction). Here, if the clearance exceeds 0.5 mm, it will affect the noise reduction and stability and controllability because the hub 2, the disc rotor 3, and the wheel 4 rotate when the vehicle is running. The hub 2 and the disc rotor 3 are connected by the hub-side protruding portion 25, and the fastening portion of the hub 2 and the disc rotor 3 becomes the portion with the rotor through-hole 34.

The second retaining protruding portion 11 is a retaining portion, and is provided between the disc rotor 3 and the wheel 4. In this example embodiment, the second retaining protruding portion 11 is formed in an annular shape protruding toward the disc rotor 3, on the rotor-side fastening surface 44. That is, the second retaining protruding portion 11 is integrally formed with the wheel 4. The second retaining protruding portion 11 is arranged on the outer peripheral side of the wheel-side protruding portion 45, and is formed facing the wheel-side fastening surface 38 of the hat portion 35 in the axial direction. Here, clearance between a tip end portion of the second retaining protruding portion 11 (i.e., the end portion on the disc rotor 3 side) and the wheel-side fastening surface 38 of the disc rotor 3 is the same as the clearance between the first retaining protruding portion 10 and the hub-side fastening surface 37 in this example embodiment. That is, the disc rotor 3 is connected to the wheel 4 by the wheel-side protruding portion 45, and the disc rotor 3 is connected to the wheel 4 by the wheel-side protruding portion 45, and the fastening portion of the hub 2 and the disc rotor 3 becomes the portion with the rotor through-hole 34. Also, in this example embodiment, the first retaining protruding portion 10 is formed facing the second retaining protruding portion 11 in the axial direction of the disc rotor 3. That is, the tip end portions of the first retaining protruding portion 10 and the second retaining protruding portion 11 face each other in the axial direction of the disc rotor 3.

When the brake device 1-2 is mounted in a vehicle, lateral force acts in the axial direction on the wheel 4 via the tire R when the vehicle turns. The generated lateral force is transmitted to the disc rotor 3 and the hub 2 from the wheel 4, but at this time, the fastening portion of the hub 2 and the disc rotor 3 and the fastening portion of the disc rotor 3 and the wheel 4 become fulcrums, and stress concentrates on these fastening portions according to the principle of leverage. The stress that concentrates at these fastening portions in this way may affect the durability of the brake device 1-2. Therefore, with the brake device 1-2, by providing the first retaining protruding portion 10, when lateral force or the like is generated, the first retaining protruding portion 10 is able to connect with the disc rotor 3, i.e., receive the load, by either the hub 2 or the disc rotor 3 deforming. Also, by providing the second retaining protruding portion 11, when lateral force or the like is generated, the second retaining protruding portion 11 is able to connect with the disc rotor 3, i.e., receive the load, by the disc rotor 3 or the wheel 4 deforming. That is, when lateral force or the like is generated, the amount of deformation of the hub 2, the disc rotor 3, and the wheel 4 is limited by the first retaining protruding portion 10 and the second retaining protruding portion 11, so the fastening state is able to switch from the fastening state at the portion with the rotor through-hole 34, i.e., the fastening portion, to a fastening state in which the hub 2, the disc rotor 3, and the wheel 4 are connected via the retaining protruding portions 10 and 11 before stress concentrates at the fastening portion. Therefore, a decrease in the durability of the brake device 1-2 is able to be inhibited. Also, the tip end portions of the first retaining protruding portion 10 and the second retaining protruding portion 11 are formed facing each other in the axial direction of the disc rotor 3, so the hub 2, the disc rotor 3, and the wheel 4 are able to be connected via the first retaining protruding portion 10 and the second retaining protruding portion 11 while the amount of deformation in the hub 2, the disc rotor 3, and the wheel 4 is still small, when a large lateral force is generated or the like. Accordingly, a decrease in the durability of the brake device 1-2 is able to be further inhibited.

In the second example embodiment described above, the clearance between the first retaining protruding portion 10 and the hub-side fastening surface 37, and the clearance between the second retaining protruding portion 11 and the wheel-side fastening surface 38 are the same in this example embodiment, but they may also be different. Also, a configuration in which only one of the first retaining protruding portion 10 and the second retaining protruding portion 11 is provided is also possible. Further, the first retaining protruding portion 10 and the second retaining protruding portion 11 may be fixed to the disc rotor 3 instead of to the hub 2 and the wheel 4. Also, the first retaining protruding portion 10 and the second retaining protruding portion 11 may be formed divided at equal intervals in the circumferential, instead of being annular. Also, the first retaining protruding portion 10 and the second retaining protruding portion 11 may be provided separately on the hub 2 and the wheel 4.

Also, the effect from the hub 2 and the wheel 4 on the disc rotor 3 is able to be suppressed more when the contact portion between the hub 2 and the disc rotor 3 and the contact portion between the disc rotor 3 and the wheel 4 are smaller. Therefore, in the first and second example embodiments and the first and second modified examples, the contact portions may be reduced by, for example, forming slits or the like at equal intervals in the circumferential direction in, the tip end portions of the hub-side protruding portion 25, the wheel-side protruding portion 45, the hub-side collar 8, and the wheel-side collar 9.

The invention claimed is:
1. A brake device comprising:
   a hub in which a hub through-hole is formed, wherein the hub comprises a rotor-side fastening surface of the hub;

a wheel in which a wheel through-hole is formed, wherein the wheel comprises a rotor-side fastening surface of the wheel;

a disc rotor in which a rotor through-hole is formed, wherein the disc rotor comprises a hub-side fastening surface and a wheel-side fastening surface, and wherein the disc rotor is arranged between the hub and the wheel;

a fixing portion that fixes the hub, the disc rotor, and the wheel together by being inserted into the hub through-hole, the rotor through-hole, and the wheel through-hole;

a hub-side connecting portion is positioned between the hub and the disc rotor, and connects the hub and the disc rotor together with a gap formed between the rotor-side fastening surface of the hub and the hub-side fastening surface, the hub-side connecting portion abutting against a hub-side end portion of the disc rotor, which defines the rotor through-hole; and a wheel-side connecting portion positioned between the disc rotor and the wheel, the wheel-side connecting portion integrally formed on the wheel or the wheel-side connecting portion formed separately from the wheel, and the wheel-side connecting portion configured to connect the disc rotor and the wheel together with another formed between the rotor-side fastening surface of the wheel and the wheel-side fastening surface so that the rotor-side fastening surface of the wheel is separate from the wheel-side fastening surface, while the wheel-side connecting portion abuts against a wheel-side end portion of the disc rotor, which defines the rotor through-hole.

2. The brake device according to claim 1, wherein:
the hub-side connecting portion and the wheel-side connecting portion are each formed in an annular shape; and
the fixing portion is inserted into the hub-side connecting portion and the wheel-side connecting portion.

3. The brake device according to claim 2, wherein:
the hub-side connecting portion protrudes from a surface of the hub that faces the disc rotor, and is formed in a tapered shape so as to become smaller in diameter farther toward a tip end portion;
the wheel-side connecting portion protrudes from a surface of the wheel that faces the disc rotor, and is formed in a tapered shape so as to become smaller in diameter farther toward a tip end portion;
a diameter of the tip end portion of each of the hub-side connecting portion and the wheel-side connecting portion is smaller than a diameter of the rotor through-hole; and a portion of the hub-side connecting portion and a portion of the wheel-side connecting portion are inserted into the rotor through-hole.

4. The brake device according to claim 2, wherein
the hub-side connecting portion is a hub-side collar that abuts, at a hub-side end portion of the hub-side collar, against a surface of the hub that faces the disc rotor, and is formed in a tapered shape so as to become smaller in diameter from the hub-side end portion toward a tip end portion;
the wheel-side connecting portion is a wheel-side collar that abuts, at a wheel-side end portion wheel-side collar, against a surface of the wheel that faces the disc rotor, and is formed in a tapered shape so as to become smaller in diameter from the wheel-side end portion toward a tip end portion;
a diameter of the tip end portion of each of the hub-side connecting portion and the wheel-side connecting portion is smaller than a diameter of the rotor through-hole; and
a portion of the hub-side connecting portion and a portion of the wheel-side connecting portion are inserted into the rotor through-hole.

5. The brake device according to claim 4, wherein a tip end portion of one of the hub-side connecting portion and the wheel-side connecting portion is press-fit into the other of the hub-side connecting portion and the wheel-side connecting portion.

6. The brake device according to claim 1, further comprising:
a retaining portion that is provided at at least one of a position between the hub and the disc rotor and on an outer peripheral side of the hub-side connecting portion, and a position between the disc rotor and the wheel and on an outer peripheral side of the wheel-side connecting portion, wherein
there is a predetermined clearance between the retaining portion and at least one of the hub, the disc rotor, and the wheel that faces the retaining portion.

7. The brake device according to claim 6, wherein
the retaining portion includes a first retaining portion provided between the hub and the disc rotor, and a second retaining portion provided between the disc rotor and the wheel; and
the first retaining portion and the second retaining portion face each other in an axial direction of the disc rotor.

8. The brake device according to claim 2, wherein:
the hub through-hole is formed through an inside of the hub-side connecting portion;
the wheel through-hole is formed through an inside of the wheel-side connecting portion; and
the fixing portion is inserted into the hub-side connecting portion and the wheel-side connecting portion, by being inserted into the hub through-hole and the wheel through-hole.

* * * * *